United States Patent [19]
Hoppman et al.

[11] 3,826,405
[45] July 30, 1974

[54] METHOD OF ORIENTING ARTICLES

[75] Inventors: Kurt H. Hoppman, Falls Church, Va.; George W. Edmunds, Derwood, Md.

[73] Assignee: Hoppmann Corporation, Springfield, Va.

[22] Filed: June 20, 1972

[21] Appl. No.: 264,636

[52] U.S. Cl.................. 221/1, 198/33 AA, 221/160
[51] Int. Cl.............................................. B23q 7/12
[58] Field of Search................ 221/1, 160, 156–162, 221/277, 167–170; 198/33 AA

[56] References Cited
UNITED STATES PATENTS

| | | | |
|---|---|---|---|
| 2,665,005 | 1/1954 | Mundy | 221/160 |
| 2,918,163 | 12/1959 | Willis | 198/33 AA |
| 3,272,310 | 9/1966 | Blickisdorf | 198/33 AA |
| 3,592,336 | 7/1971 | Thurston | 221/156 |

*Primary Examiner*—Robert B. Reeves
*Assistant Examiner*—Thomas E. Kocovsky

[57] ABSTRACT

Method of orienting articles which have a configuration consisting of a shank and a head including rotating the parts upon an inner plane so as to distribute them centrifugally, guiding the parts from the inner plane upwardly onto a rotating outer rim which aligns the parts in single file, gating exit of the particles from the rim and radially orienting the articles so as to place them in side by side relationship while tangentially guiding the articles away for pakcaging, counting or the like.

19 Claims, 12 Drawing Figures

PATENTED JUL 30 1974 3,826,405

METHOD OF ORIENTING ARTICLES

BACKGROUND OF THE INVENTION

1. Field of the Invention

Increasing attention is being given to methods for high speed orientation of nails, small arms munitions and the like. Recent inventors have evolved a plurality of rotating devices which centrifugally discharge articles to be counted from the edges of the rotating plane. Traditionally, these centrifugally discharged articles are forced through a stationary exit aperture and thence counted, as they are tangentially ejected. The primary shortcoming of utilizing stationary exit apertures is the tendency of such devices to become jammed with the article being sorted, necessitating shut down for clearing of the aperture in order to continue counting.

2. Description of the Prior Art

| | |
|---|---|
| 2,632,588 | Hoar |
| 2,763,108 | Garrett |
| 3,063,596 | d'Autheville |
| 3,170,627 | Pearson |
| 3,215,310 | Hurst |
| 3,253,604 | Read |
| 3,266,664 | Pearson |
| 3,368,713 | Hurst |

SUMMARY OF THE INVENTION

According to the present invention the devices being sorted are placed upon a rotating inner plane from which they are discharged upwardly by means of a peripheral ramp leading onto an outer rotating rim. The outer rotating rim is a narrow width so as to align the articles in end to end relationship. Those articles which cannot be aligned fall off the outer rotating rim back into the inner rotating plane for reorientation. The articles in single file relationship are guided through an open gate and thence oriented radially by means of centrifugal force such that the tip end of the device is pivoted outwardly through a peripheral slot. The articles thus being placed in side by side relationship are removed tangentially from the slot by a belt or other conveyor means.

DESCRIPTION OF THE PREFERRED EMBODIMENTS

Figure 1:
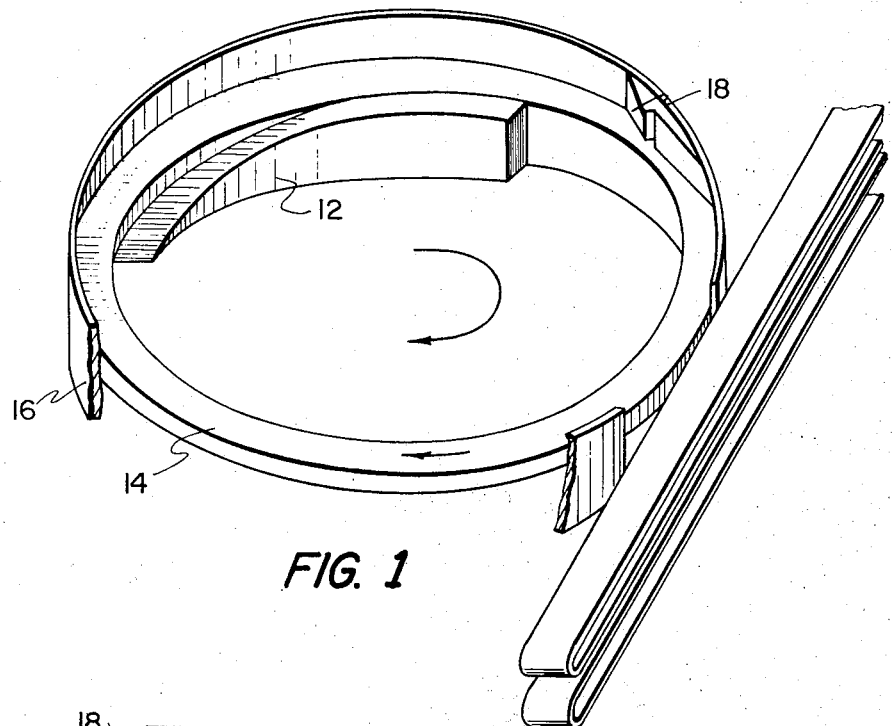
FIG. 1 is a perspective view of the proposed sorting device.

In FIG. 1 a rotating inner bowl 10 shown is supported inwardly of stationary ramp 12 leading from the bottom of the rotating bowl upwardly to the plane of an outer rotating rim 14. A stationary peripheral guide 16 encircles outer rotating rim 14 and an open gate 18, as particularly illustrated in FIG. 2 may be employed to gauge the single file discharge of articles 20 being sorted. The rotating rim 14 is of such width that the articles can only be supported in single file relationship. The open gate thus discharges the articles inwardly which are not in single file relationship, the discharged articles falling downwardly onto the rotating bowl for reorientation.

Figure 3:
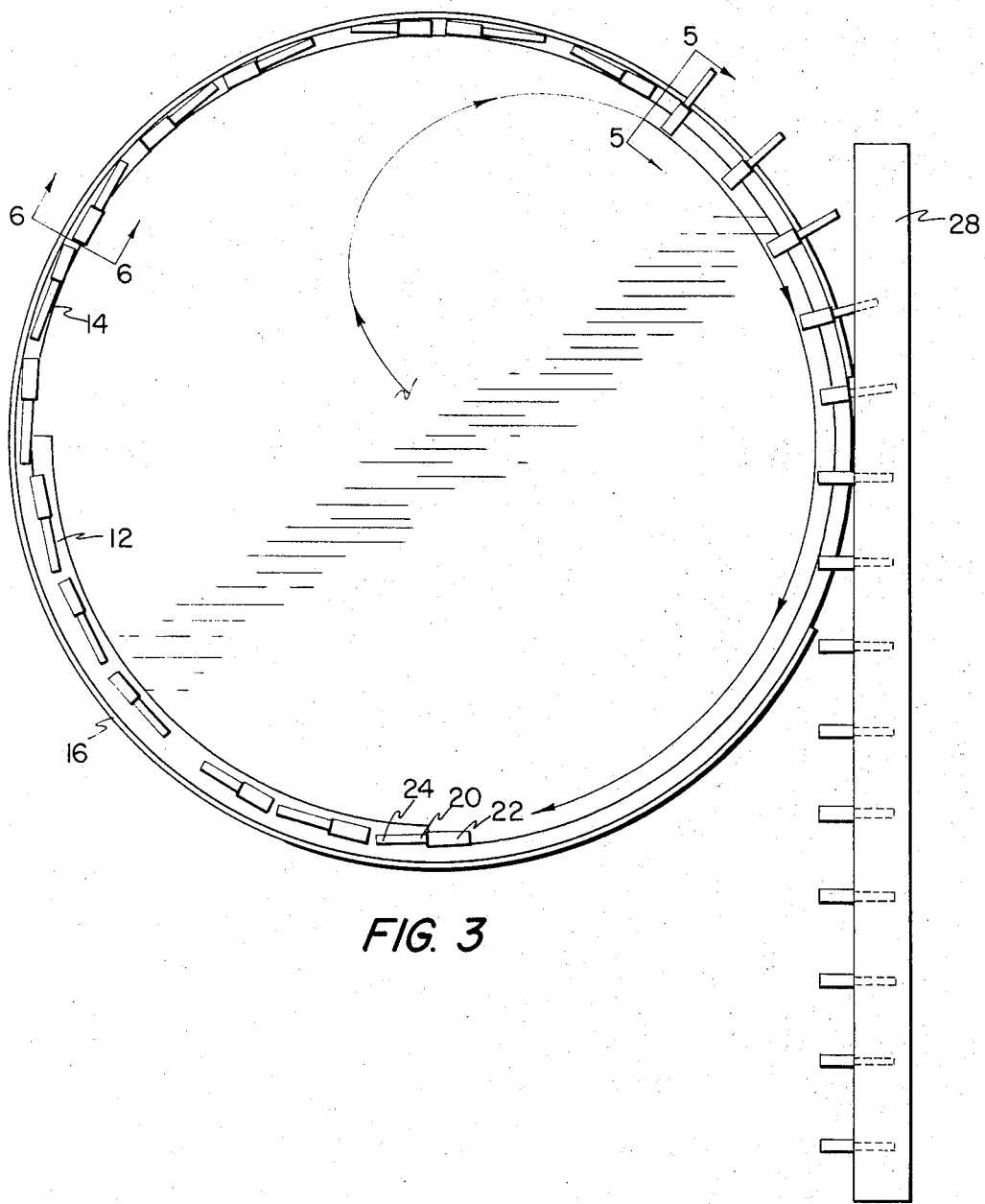
FIG. 3 is a top plan of the sorting mechanism.

As illustrated in FIG. 3, the articles 20 being of the elongated type having a head 22 and a tapered tip 24 are radially oriented by means of horizontal slot 26 cut into the stationary wall 16. The articles are oriented radially and thence removed tangentially in side by side relationship by means of belts 28 and 30 mounted respectively upon rotating elements 32.

As will be apparent, the present method is useful not only in orienting parts at high speeds, but also is useful in orienting those parts in which the center of gravity is very close to the head or enlarged portion of the article being oriented.

Figures 2, 5:
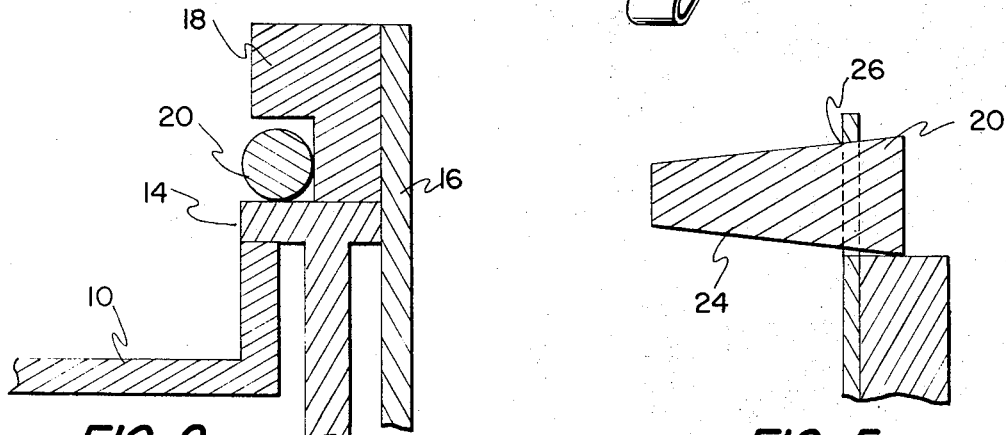
FIG. 2 is an enlarged, fragmentary vertical section showing the juxtaposition of inner rotating plane, rotating outer rim and gating mechanism.
FIG. 5 is an enlarged fragmentary elevation showing orienting of the device through the gating slot.
Figure 6:
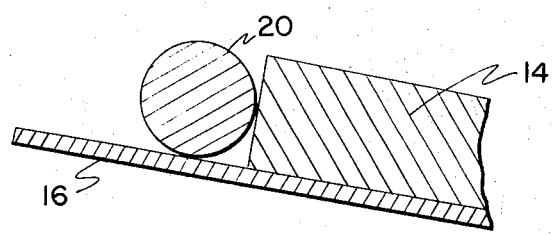
FIG. 6 is a fragmentary vertical section showing single file positioning of the articles being sorted upon the outer rotating rim, as in FIG. 3.

Due to this configuration, the parts will naturally assume the end to end position upon the inner rotating plane 10 and outer rotating rim 14. Rim 14 being configured such that it is only wide enough to support one part, the parts are restrained from moving off the outside edge of the rim by a stationary side. Horizontal slot 26 is configured such that the shank portion of the part will fit through the slot while the head portion will be restrained. As the position of the parts coincides with the slot inside, centrifugal force acting on the parts will cause them to assume a radial position as illustrated in FIG. 3 and FIG. 5.

The speed of the rotating rim 14 can be set so that the centrifugal force is quite high. When this condition exists the force tending to orient the parts will be high allowing the parts to be oriented radially in a relatively short distance. The orienting slot 26 is open at one end so that the parts can be removed from the rim in an oriented position as illustrated in FIG. 3.

Figure 4:
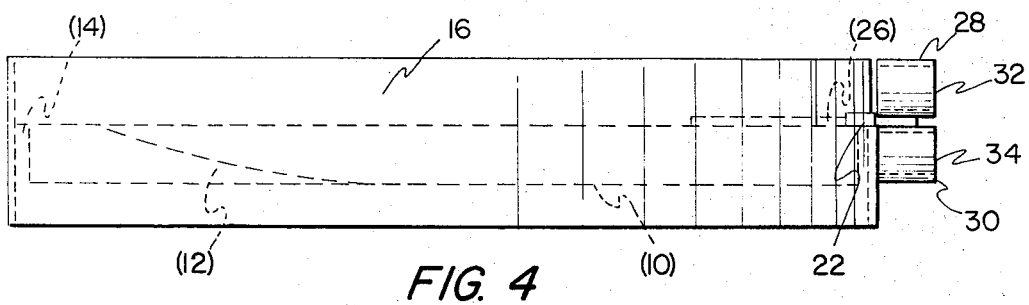
FIG. 4 is an end elevation.
Figure 7:
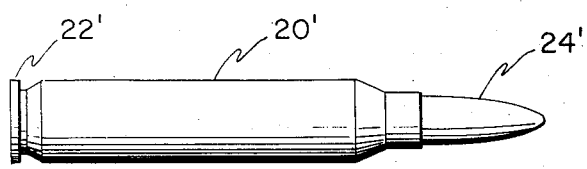
FIG. 7 is an elevation of a small arms shell of the type which can be oriented.
Figure 10:
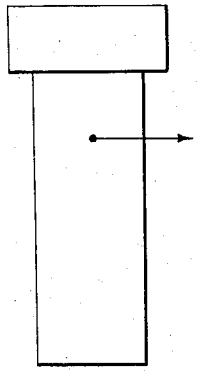
FIG. 10 is a diagram of the orienting forces utilized according to present method.
Figure 11A:
FIG. 11A and FIG. 11B are exploded views of the general type of elongated articles which may be oriented.
Figure 11B:
Figure 8:
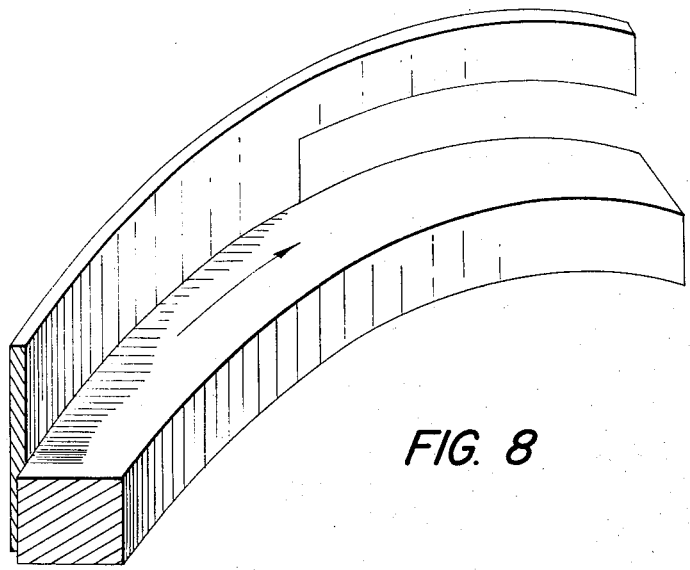
FIG. 8 is an enlarged fragmentary perspective of the outer rotating rim and orienting slot.
Figure 9:
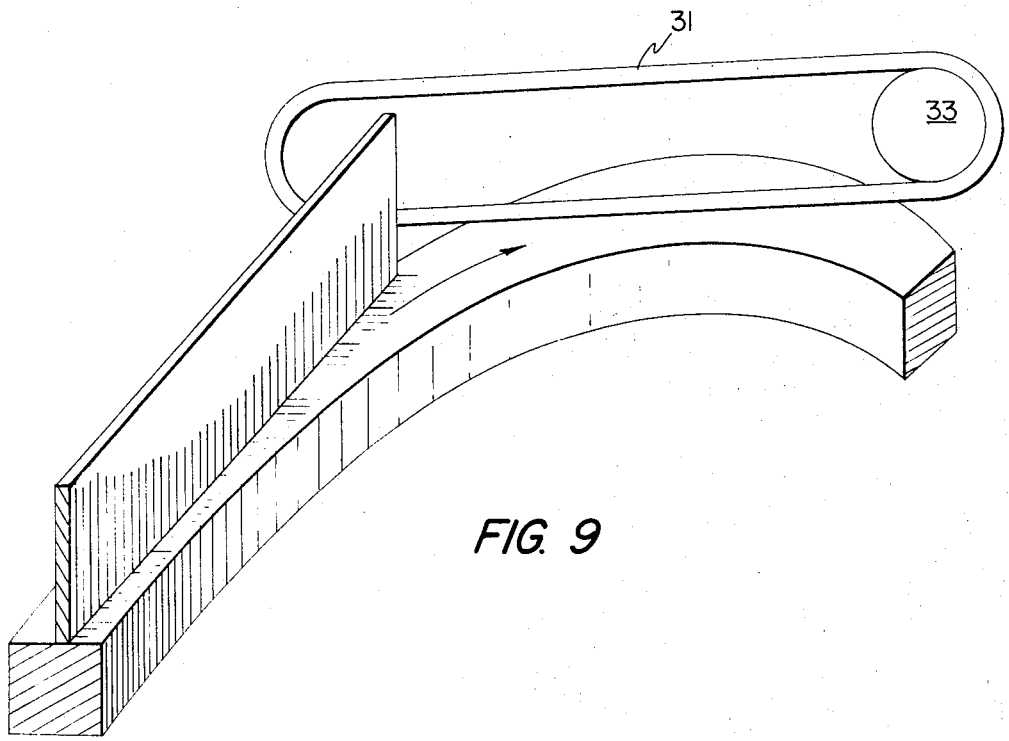
FIG. 9 is a fragmentary perspective of an outer rotating rim and the employment of a moving belt as the orienting slot.

Orienting slot 26 may be constructed in any one of several basic methods. The sides of the slots can be formed by the rotating rim forming the lower edge and an extension of the stationary side forming the upper edge, as illustrated in FIG. 8. The upper edge in this case could be a low friction material such as polished stainless steel or teflon. The upper edge of the slot can also be formed by a moving belt 31 such as is shown in FIG. 9. In FIGS. 3 and 4 belts 28 and 30 are shown mounted upon rotating elements 32 and 34, so as to move at the same linear speed as rotating rim 14. In this modification belt 28 forms the upper edge of the slot and belt 30 forms the lower edge of the slot, the belts being utilized to carry the parts away from the rim such as is illustrated FIG. 3.

According to this method the articles can be sorted at extremely high speeds, for example, in excess of 1,500 parts per minute. Manifestly, the suggested sorting elements can be modified extensively without departing from the scope and spirit of invention as defined in the attached claims.

According to a modification of invention and where radial orientation is not desired, the orienting slot may be removed. Thus articles such as pills, candy, screws, nuts, bolts, nails, rivets, threaded insets, money, dowel pins, square keys, marbles and the like may be aligned and advanced for operations such as feeding and counting.

According to another modification of invention and where radial orientation is not desired and where somewhat lower speeds than those described above can be tolerated, rim 14 may be non-rotating and stationary. Thus articles such as described above may be aligned and advanced in an end to end relationship for subsequent counting and packaging operations.

We claim:

1. Method of sorting particulate articles comprising:

A. centrifugally distributing while accelerating said articles upon a rotating inner plane;
   B. discharging said accelerating articles upon an inclined stationary ramp at the periphery of said rotating inner plane; and
   C. centrifugally carrying said articles away from the top of said ramp upon a rotating outer rim, such that said articles move radially outwardly across said rim prior to tangential discharge.

2. Method of sorting particulate articles comprising:

A. centrifugally distributing while acceleraing said articles upon a rotating inner plane;
   B. discharging said accelerating articles upon an stationary incline at the periphery of said rotating inner plane;
   C. centrifugally carrying said articles away from the top of said incline upon a rotating outer rim; and
   D. gauging tangential discharge of said articles from said rim.

3. Method of sorting particulate articles as in claim 2 including independently supporting said inclined ramp as an arcuate segment independently superposed with respect to the periphery of said rotating inner plane.

4. Method of sorting particulate articles as in claim 3, including varying the incline, so as to control discharging of said srticles upon said outer rim.

5. Method of sorting particulate articles comprising:

A. centrifugally distributing while accelerating said articles upon a rotating inner plane;
   B. discharging said accelerating articles upon an inclined stationary ramp at the periphery of said rotating plane;
   C. centrifugally carrying said articles away from the top of said ramp upon a rotating outer rim;
   D. single file gauging tangential discharge of said articles from said rim through a stationary exit;
   E. centrifugally orienting said articles in a radial position with respect to said inner rotating plane through a peripheral slot defined at the periphery of said rotating outer rim; and
   F. discharging said articles from said slot in side by side alignment.

6. Method of sorting particulate articles as in claim 5, including varying the speed of rotating said inner plane, so as to control accelerating and discharging of said articles.

7. Method of sorting particulate articles as in claim 5, including varying the speed of rotation of said outer rim so as to control the rate of gauging and discharging of said articles.

8. Method of sorting particulate articles as in claim 5, wherein said articles are elongate in nature.

9. Method of sorting particulate articles as in claim 5, wherein said articles are of the type having an elongate shank and enlarged head at one end.

10. Method of sorting particulate articles as in claim 9, wherein said articles have a center of gravity adjacent the enlarged head.

11. Method of sorting particulate articles as in claim 5, said discharging including tangentially guiding said articles away from said rotating rim.

12. Method of sorting particulate articles as in claim 11, wherein said tangential guiding is by belt means.

13. Method for sorting particulate artices as in claim 11, including adjusting the height of said slot prior to said discharging such that said height is less than the widest diameter of said articles being sorted.

14. Method of sorting particulate articles as in claim 13, including adjusting the height of said slot so as to control radial orientation of said articles.

15. Method of sorting particulate articles as in claim 11 wherein said tangential guiding is by means of a pair of superposed belts rotatably supported to engage the top and bottom of said articles discharging from said slot.

16. Method of sorting particulate articles as in claim 15, including recovering upon said rotating inner plane and centrifugally redistributing those articles which have been ejected at said single file gauging.

17. Method of sorting particulate articles as in claim 11, including rotating said inner plane at a speed sufficient to accelerate said articles such that said discharging articles travel from said rotating inner plane upon the inclined ramp to the superposed plane of said rotating outer rim.

18. Method of sorting particulate articles as in claim 17, including limiting the horizontal width of said rotating rim so as to support only a single article at one time.

19. Method of sorting particulate articles as in claim 18, wherein said single file gauging includes both contacting from one side and contacting from above with respect to said rotating rim.

* * * * *